A. SCHAFER.
INCUBATOR.
APPLICATION FILED AUG. 11, 1919.
1,330,141. Patented Feb. 10, 1920.
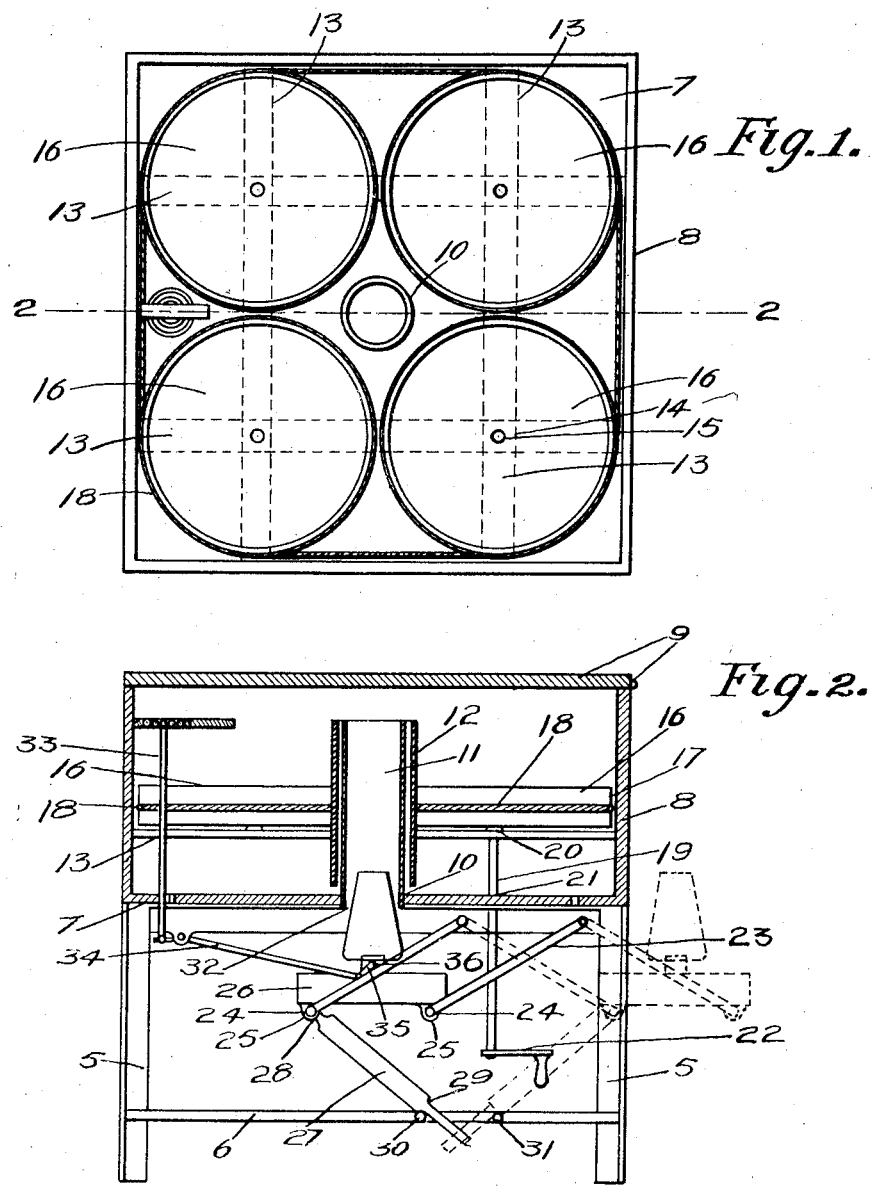

UNITED STATES PATENT OFFICE.

ADAM SCHAFER, OF SWEET WATER, ILLINOIS.

INCUBATOR.

1,330,141.  Specification of Letters Patent.  Patented Feb. 10, 1920.

Application filed August 11, 1919. Serial No. 316,669.

*To all whom it may concern:*

Be it known that I, ADAM SCHAFER, a citizen of the United States, residing at Sweet Water, in the county of Menard and State of Illinois, have invented a new and useful Incubator, of which the following is a specification.

This invention relates to new and useful improvements in incubators, and more particularly to incubators having circular egg trays.

The primary object of the invention is to provide exterior means for rotating the egg trays simultaneously within the incubators, thereby moving certain eggs of the tray, from a point nearest the source of heat, to a position remote from the heating medium.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawing—

Figure 1 illustrates a top plan view of an incubator, constructed in accordance with the present invention, the cover or top thereof being removed.

Fig. 2 illustrates a sectional view taken on line 2—2 of Fig. 1, and showing the lamp in its extended position in dotted lines.

Referring now to the drawing in detail, the reference character 5 indicates the supporting legs of the incubator, which are positioned under the respective corners of the incubator proper, and which are connected adjacent the lower ends thereof by the horizontal connection members 6.

Supported on the upper ends of the supporting legs 5, is a substantially square table 7, forming the bottom of the lower section, which includes side wall 8, and a hinged upper section 9 operating to close the top of the incubator, the same being hinged to one of the side walls 8 by means of the hinges 9.

The floor 7, of the incubator, is provided with a centrally disposed circular opening 10, to the walls of which is secured the tubular flue 11, which extends upwardly from the bottom 7, and terminates at a point below the inner surface of section 9, to provide a clearance between the upper edge of the flue 11 and section 9.

Disposed within the incubator, and in spaced relation with the flue 11, is a tubular member 12, the lower end of which is spaced from the bottom 7 of the incubator, to provide a passageway between the lower end of the tubular member 12 and the floor, whereby a circulation is set up between the flue 11 and the tubular member 12 for distributing the heat from the heating medium, uniformly throughout the interior of the incubator.

Arranged within the incubator proper, and spaced from the bottom 7 thereof, are the horizontal bars 13, which cross each other as at 14, for providing supports for the pins 15, which support the respective circular egg trays 16, and allow rotary movement thereof, with relation to the incubator.

As shown, each of the egg trays includes a circular base plate having integral upwardly extending flanges 17, provided with a central depression to receive the flexible connecting member 18, which has its ends connected to one of the circular egg trays, in such a way that movement of said egg tray will produce a relative and simultaneous movement of all the egg trays supported within the incubator.

An operating shaft 19, has its upper end connected to one of the egg trays as at 20, the lower end thereof extending downwardly and passing through an opening 21 formed in the bottom 7, and has connection with the crank arm 22, to permit the said egg tray to be rotated.

The substantially U-shaped supporting rods 23, have their upper ends secured to the under side of the bottom 7, in such a way that the same will be free to swing laterally, for purposes to be hereinafter more fully described.

The lower ends 24 of the U-shaped supporting rods 23, are positioned between the lugs 25 formed on the under side of the lamp 26, whereby the lamp 26 is supported in proper relation with the flue 11. A rod 27, has its upper end pivotally connected to the under side of the lamp 26, as at 28, the lower end thereof being formed into a handle, and provided with notches 29 adjacent the lower end of the handle, said notches adapted to engage over the pins 30 and 31 secured to one of the horizontal members 6.

As shown, the lamp is in its operative position, but if the same is to be moved to its inoperative position for the purpose of filling or cleaning the same, it is only necessary to disengage the notch 29 and pin 30, which allows the lamp to be swung to the position as shown by Fig. 2, in dotted lines, the notch 29 on the opposite side of the rod 27, being shown as engaging the pin 31, for supporting the lamp in such inoperative position.

It will thus be seen that after the lamp has been properly attended to, the same is easily swung back to its operative position, where the same is prevented from displacement, due to the engagement of the notch, with the pin 30.

The lamp 26, is provided with the usual burner, and lamp globe, however, the lamp globe in this particular instance, being shown as smaller at its top than at the lower end thereof, for the purpose of providing a passageway 32 between the lamp globe and the lower end of the flue 11, to permit fresh air to enter the incubator, where the same is heated on its passage through the flue 11.

In order that the operation of the lamp, will be automatic, I have provided a thermostat, which is located within the incubator, at any particular point, the thermostat being connected by means of the levers 33 and 34, to the arm 35, which has connection with the movable regulating member 36, pivoted to the burner proper, the member 36 adapted to move over the blaze of the lamp, for cutting off, or reducing the size of the flame to regulate the heat within the incubator, to maintain the same at an even predetermined temperature.

In operation it is of course a known fact that the eggs within the incubator must be moved, with relation to the source of heat, at predetermined intervals, and in the incubators of known construction, it is necessary to remove the top or open the incubator in order to accomplish this result, while in the present invention, it is only necessary to rotate the handle 22, with the result that the incubator trays 16 are correspondingly rotated with the result that the eggs which were previously positioned at a point adjacent the source of heat supply, are now moved to a position remote from the heat supply.

It will be seen that since the horizontal bars 13, are held in spaced relation with the bottom of the lower section of the incubator, that the compartment formed between the horizontal bars 13 and bottom, may be used for a nursery, for housing the chicks, immediately after the hatching.

Having thus described my invention, what I claim is:—

1. In combination with an incubator having a central flue, a plurality of circular trays rotatably supported adjacent the flue, flexible means connecting the trays whereby movement of one of the trays produces a relative movement of all the trays, and means for controlling the trays to move predetermined portions thereof into proximity with the central flue.

2. In combination with an incubator including a housing having a central flue, a plurality of circular trays operating in a horizontal plane, said trays adapted to support eggs, a portion of each of the trays being disposed adjacent the flue, means for connecting the trays, and means for revolving the trays simultaneously to move predetermined portions of the trays into proximity with the central flue.

In testimony that I claim the foregoing as my own, I have hereto affixed my signature in the presence of two witnesses.

ADAM SCHAFER.

Witnesses:
GEORGE C. REED,
FRANK BURGOYNE.